Patented Oct. 19, 1937

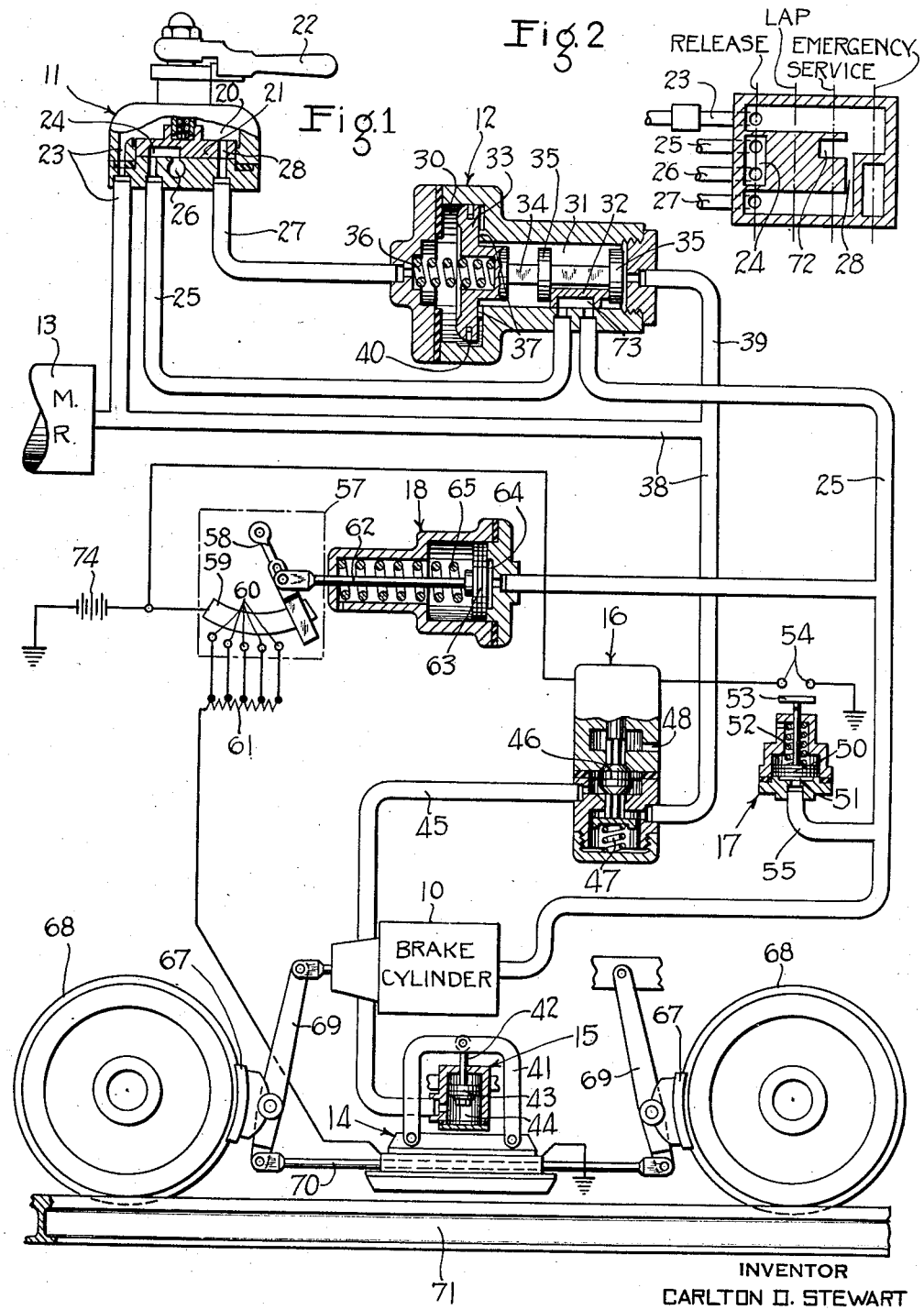

2,096,474

UNITED STATES PATENT OFFICE 2,096,474

BRAKING SYSTEM

Carlton D. Stewart, Swissvale, Pa., assignor to The Westinghouse Air Brake Company, Wilmerding, Pa., a corporation of Pennsylvania Application February 1, 1936, Serial No. 61,929

10 Claims. (Cl. 303—3)

This invention relates to braking systems, and more particularly to braking systems for traction vehicles and railway trains employing both fluid pressure brakes and magnetic track brakes.

In the design and manufacture of certain types of modern traction and railway vehicles rubber inserts are placed between the wheel treads and the wheel hubs in order to produce quiet operation. Where such rubber inserts are employed the degree of braking which may be produced on the wheel treads is limited, because if the wheel treads are permitted to become overheated the rubber inserts may be wholly destroyed or damaged beyond usefulness. Since the degree of braking on the wheel treads must be thus limited, other brake means must be employed to produce sufficient braking to stop the vehicle in a reasonably short distance.

A desirable type of auxiliary brake means to employ is a magnetic track brake. As is well known, this type of brake employs one or more magnetic track brake devices which, in their inoperative or release position, are normally suspended above the track rails and caused to engage the rails in their application position, to produce a braking effect on the track rails. At, or slightly before, the time of engagement with the track rails the track brake devices are energized, so that the track braking is produced solely as a result of the magnetic attraction between the track brake devices and the rails.

Where a magnetic track brake is used in conjunction with a shoe-on-wheel type of brake, as for example the fluid pressure operated shoe-on-wheel brake, it is desirable that means be provided whereby the degree of application of each of these brakes may be controlled conjointly in response to the manipulation of a single control handle. At the same time, it is undesirable to permit the fluid pressure brakes to be applied to a degree such that the rubber inserts in the wheels would be damaged.

It is a principal object of the present invention to provide a combined fluid pressure and track brake equipment in which the degree of application of each brake is controlled according to, and in response to, manipulation of a single control element.

A further object of the present invention is to provide a combined brake system of the type above referred to, in which control of the lowering of the track brake devices into engagement with the track rail, and the degree of energization thereof, are controlled according to brake cylinder pressure.

A yet further object of the invention is to provide a combined fluid pressure and magnetic track brake equipment, in which the magnetic track brake will be cut out of action at a low brake cylinder pressure. In this manner the magnetic track brake devices may be deenergized during the time the vehicle is held at rest, where only a low brake cylinder pressure is required.

A still further object of the invention is to provide a combined fluid pressure and magnetic brake equipment, in which applications of both types of brakes may be effected either by straight air operation or by automatic operation, straight air operation being employed for normal service applications and automatic operation being employed for emergency applications.

Other objects and advantages of the invention, dealing with specific constructions and arrangements of parts, will be more fully understood from the following description, which is taken in connection with the attached drawing, wherein Fig. 1 shows in schematic and diagrammatic form one embodiment of the invention adapted for a single vehicle, and Fig. 2 illustrates in diagrammatic form communications established by the brake valve device shown to the upper left in Fig. 1.

Referring now to the drawing, the fluid pressure brake system may comprise one or more brake cylinders 10, a brake valve device 11, an emergency valve device 12, and a main reservoir 13.

The magnetic track brake system may comprise one or more magnetic track brake devices 14, a like number of raising cylinders 15, a magnet valve device 16, a fluid pressure operated switch device 17, and a fluid pressure operated rheostat device 18.

Considering now these devices more in detail, the brake valve device 11 may be one of a number of types, and I have by way of illustration shown a rotary valve type embodied in a casing having a chamber 20 in which is disposed a rotary valve 21 operated by a handle 22. The chamber 20 is in open communication with the main reservoir 13 by way of pipe and passage 23.

When the handle 22 is in release position, a cavity 24 establishes communication between a straight air pipe 25 and exhaust port 26, as is diagrammatically shown in Fig. 2. Also in release position of the handle 22, an emergency pipe 27 is connected to chamber 20, by a port 28 in the rotary valve 21.

In lap position of the handle 22, the straight air pipe 25 is disconnected from the exhaust port 26, while the emergency pipe 27 is maintained connected to chamber 20. In service application position of the handle 22, the straight air pipe 25 is connected to the chamber 20, and in emergency application position the emergency pipe 27 is disconnected from chamber 20 and connected to exhaust port 26.

The emergency valve device 12 is embodied in a casing having a piston chamber 30 and a slide valve chamber 31. Disposed in the slide valve chamber 31 is a slide valve 32, which is adapted to be operated by and coextensive with movement of a piston 33 operatively mounted in the piston chamber 30. The piston 33 is provided with a stem 34 having collars 35 thereon for engaging the slide valve 32. A spring 36 urges the piston 33 to its extreme right hand position, where it comes to rest against stops 37.

The slide valve chamber 31 is in communication with the main reservoir 13 by way of main reservoir pipe 38 and branch pipe 39. The piston chamber 30 is in communication with the emergency pipe 27. When the piston 33 is in the position as illustrated in Fig. 1, the piston chamber 30 is in restricted communication with the slide valve chamber 31 by way of feed groove 40.

The magnetic track brake device 14 may be of any of the types commonly employed. This track brake device may have attached thereto a bracket 41 which is connected to a stem 42 of piston 43 disposed in chamber 44 of the raising cylinder 15. Chamber 44 is connected by a pipe 45 to the magnet valve device 16.

The magnet valve device 16 is embodied in a casing provided with a double beat valve 46, which is urged toward upper seated position by a spring 47 and to lower seated position by action of an electromagnet (not shown) in the upper part of the casing which when energized actuates double beat valve 46 downwardly.

When the double beat valve 46 is in upper seated position the pipe 45 is connected to main reservoir pipe 38, and when the double beat valve is in lower seated position this communication is cut off and pipe 45 is connected to the atmosphere by way of exhaust port 48.

The fluid pressure operated switch device 17 is embodied in a casing having a piston 50 disposed in a piston chamber 51. The piston 50 is urged downwardly by a spring 52 and is actuated upwardly upon supply of fluid under pressure to the chamber 51. When the piston 50 is in its upper position a bridging contact 53 engages and closes stationary contacts 54. The chamber 51 is connected by a pipe 55 to straight air pipe 25.

The fluid pressure operated rheostat device 18 comprises a rheostat 57, indicated diagrammatically, which is provided with a movable arm 58 adapted to constantly engage a contact segment 59 and to connect this segment with a plurality of contacts 60, for the purpose of cutting out portions of a resistance 61.

The arm 58 is connected by a stem 62 to a piston 63 disposed in chamber 64. A calibrated spring 65 urges the piston 63 to its extreme right hand position. When fluid under pressure is supplied to the chamber 64 the piston 63 moves to the left until the pressure exerted by the presence of fluid in chamber 64 is balanced by the opposing pressure of spring 65.

The parts are so designed that the arm 58 is not actuated to the position where segment 59 is connected to the first or right hand contact 60 until a predetermined pressure has been established in chamber 64, as for example 15 pounds. Thereafter, as the pressure in chamber 64 increases the arm 58 is actuated further in a clockwise direction to engage other of the contacts 60 to cut out portions of resistance 61.

The brake cylinder 10 has been shown in mechanical connection with brake shoes 67, operating upon the treads of vehicle wheels 68, by means of levers 69 and brake rod 70, but it is to be understood that these means are shown as illustrative only of the many types of brake riggings employed in practice.

The operation of this embodiment of my invention is as follows:

When the vehicle is running under power, or coasting, the parts of the brake equipment will be in the positions shown in Fig. 1. As will be observed from this figure, the emergency pipe 27 is in communication with the main reservoir 13, and the pressure exerted on piston 33 in the emergency valve device 12, both from the fluid pressure in piston chamber 30 and from the spring 36, biases piston 33 to its extreme right hand position. At the same time, the magnet valve device 16 is deenergized to permit the supply of fluid under pressure therethrough to the raising cylinder 15, to maintain the track brake device 14 suspended above the track rail 71.

When it is desired to effect a service application of the brakes, the handle 22 is turned to the service application position. In this position, the straight air pipe 25 is disconnected from exhaust port 26 and connected by cavity 72 to the main reservoir. Fluid under pressure then flows from the main reservoir to the straight air pipe 25. The straight air pipe is divided into two sections, the two sections being connected by cavity 73 in slide valve 32 of the emergency valve device 12 so long as the emergency pipe 27 is maintained charged.

Fluid under pressure in the straight air pipe 25 flows to the brake cylinder 10, to chamber 51 of the fluid pressure operated switch device 17, and to chamber 64 of the fluid pressure operated rheostat device 18.

When the pressure of fluid in the straight air pipe 25 reaches some predetermined low value, as for example 15 pounds, the switch device 17 will close contacts 54, while the fluid pressure operated rheostat device 18 will have actuated arm 58 to connect the right hand contact 60 to the segment 59.

Closing of the contacts 54 energizes the magnet valve device 16 from a suitable source of current supply, as a battery 74. When this valve device is energized it seats its double beat valve 46 to vent the chamber 44 in raising cylinder 15. The track brake device 14 then drops by gravity to engagement with the track rail 71.

At the same time, the connection of segment 59 with the right hand contact 60 energizes the track brake device 14 also from the battery 74. The track brake device is therefore applied when the pressure in the brake cylinder has reached a predetermined low value. Both the track brakes and the wheel brakes will thus be applied.

As the pressure of fluid supplied to the straight air pipe 25 increases, the rheostat arm 58 will be actuated further in a clockwise direction to cut out portions of resistance 61, and thus increase the energization of the track brake device 14. The brake cylinder pressure will likewise be increased, so that both the wheel braking and the track braking will be increased to a corresponding degree.

When it is desired to effect a release of the brakes following a service application, the brake valve handle 22 is returned to release position. In this position the straight air pipe 25 is reconnected to exhaust port 26 to release fluid under pressure from the brake cylinder 10 and the other devices connected to the straight air pipe 25.

When the pressure in the straight air pipe 25 diminishes to 15 pounds, the switch device 17 will open its contacts 54 and the rheostat device 18 will disconnect the track brake device 14 from the battery 74. Thereafter, the fluid pressure brakes only will remain applied to bring the vehicle to a stop.

In order to control the degree of application during a service application, the brake valve handle 22 is turned to the service position and left there until the desired pressure has been established in the straight air pipe 25. Then it is turned to the lap position.

When it is desired to effect an emergency application of the brakes, the brake valve handle 22 is turned to the emergency position where it is permitted to remain. In this position, the straight air pipe 25 is connected to the main reservoir 13, as before, while in addition the emergency pipe 27 is disconnected from the main reservoir and connected to the exhaust port 26.

The resulting venting of the emergency pipe 27 reduces the pressure in the piston chamber 30 of the emergency valve device 12, and the overbalancing pressure from the slide valve chamber 31 actuates the piston 33 to its extreme left hand position. In this position of piston 33, the slide valve 32 blanks or isolates the left hand section of the straight air pipe 25, while opening the right hand section of the straight air pipe to the slide valve chamber 31. Fluid at main reservoir pressure then flows through pipes 38 and 39 to slide valve chamber 31, and from thence through the right hand section of straight air pipe 25 to the connected devices, until equalization takes place. As will be obvious, both the fluid pressure brakes and the magnetic track brakes will be applied quickly and to a maximum degree.

It will be noted that although the emergency slide valve 32 blanks the left hand section of the straight air pipe 25, fluid under pressure will be supplied to this section through the brake valve device 11. If, therefore, for any reason, due to faults or otherwise, the piston 33 should accidentally move back to its release position, fluid under pressure would be supplied to the right hand section of the straight air pipe from the brake valve device. Thus an application of the brakes is doubly insured when effecting an emergency application.

To effect a release of the brakes following an emergency application, the brake valve handle 22 is returned to release position. In this position, the emergency pipe 27 is again connected to the main reservoir 13, and when the combined pressure of fluid in piston chamber 30 and spring 36 overbalances the pressure in the slide valve chamber 31, piston 33 will move back to its release position and thus connect the two sections of the straight air pipe. The straight air pipe will then be vented to the atmosphere through cavity 24 in the brake valve device.

It will thus be seen that in the embodiment of my invention illustrated both the fluid pressure and magnetic track brakes may be controlled from a single control handle, and that applications may be effected by either straight air operation or by automatic operation.

While I have illustrated and described my invention with particular reference to one embodiment thereof, it is not my intention to be limited to this embodiment or otherwise than by the spirit and scope of the appended claims.

Having now described my invention, what I claim as new and desire to secure by Letters Patent, is:

1. In a vehicle brake system, in combination, fluid pressure brake means, a magnetic track brake device, a pipe to which fluid under pressure is supplied in effecting operation of said fluid pressure brake means to supply the brakes, electroresponsive means operable when deenergized to effect suspension of said track brake device above a track rail, and when energized to effect engagement of said track brake device with said track rail, switch means responsive to a predetermined low pressure in said pipe for effecting energization of said electroresponsive means, and separate and independently operable current controlling means also responsive to a predetermined low pressure of fluid in said pipe for effecting and controlling energization of said track brake device.

2. In a vehicle brake system, in combination, a brake cylinder, a magnetic track brake device, a pipe to which fluid under pressure is supplied in effecting a supply of fluid under pressure to said brake cylinder, electroresponsive means for controlling raising and lowering of said track brake device out of and into engagement with a track rail, switch means responsive to pressure in said pipe for effecting operation of said electroresponsive means to cause engagement of said track brake device with said track rail, and separately operable current controlling means also responsive to the pressure in said pipe for connecting said track brake device to a source of current supply at a low pressure and for thereafter varying the current in said track brake device as the pressure in said pipe increases.

3. In a vehicle brake system, in combination, a brake cylinder, a magnetic track brake device, a first circuit for supplying current to said track brake device, a resistance in said first circuit, a second circuit for controlling raising and lowering of said track brake device out of and into engagement with a track rail, said track brake device being raised when said second circuit is open and lowered when said second circuit is closed, a pipe to which fluid under pressure is supplied in effecting a supply of fluid under pressure to said brake cylinder, a switch device responsive to the pressure of fluid in said pipe for closing said second circuit, and separate fluid pressure operated means also responsive to the pressure of fluid in said pipe for first connecting said first circuit to a source of current supply and for then cutting out portions of said resistance.

4. In a vehicle brake system, in combination, a brake cylinder, a magnetic track brake device, a pipe to which fluid under pressure is supplied in effecting a supply of fluid under pressure to said brake cylinder, electroresponsive means for normally causing said track brake device to be suspended above a track rail and operative at a low pressure in said pipe for effecting engagement of said track brake device with said rail, current controlling means responsive to a low pressure in said pipe for connecting said track brake device to a source of current supply and for varying the current supplied thereto as the pressure in said pipe increases, manually operated means for effecting a supply of fluid under pressure to said pipe to various degrees, and an automatic valve device operated upon a decrease in pressure for effecting a supply of fluid under pressure to said pipe to a maximum degree.

5. In a vehicle brake system, in combination, a brake cylinder, a magnetic track brake device, fluid pressure operated means operated when fluid under pressure is supplied thereto to maintain said track brake device suspended above a track rail and operated when fluid under pressure is released therefrom to permit said track brake device to drop by gravity to engagement with the track rail, means for establishing a communication through which fluid under pressure is supplied to variable degrees in effecting a supply of fluid under pressure to said brake cylinder, an automatic valve device operated upon a decrease in pressure for closing said communication to said variable supply and for connecting said communication to a maximum supply, electroresponsive means responsive to a low pressure of fluid supplied to said communication for reducing the pressure in said fluid pressure operated means to permit said track brake device to drop to engagement with the track rail, and current controlling means also responsive to a low pressure of fluid supplied to said communication for connecting said track brake device to a source of current supply and operable upon an increase of pressure in said communication for increasing the current supplied to said track brake device.

6. In a vehicle brake system, in combination, a brake cylinder, a magnetic track brake device, fluid pressure operated means operable when fluid under pressure is supplied thereto to maintain said track brake device suspended above a track rail and operated upon a decrease of pressure therein to permit said track brake device to drop by gravity to engagement with the track rail, a magnet valve device operable when deenergized to effect a supply of fluid under pressure to said fluid pressure operated means and when energized to effect a decrease of pressure in said fluid pressure operated means, means for effecting a supply of fluid under pressure to said brake cylinder, a switch device operated at a low brake cylinder pressure for effecting energization of said magnet valve device, and separate current controlling means operated at a low brake cylinder pressure for connecting the track brake device to a source of current supply and operable as brake cylinder pressure increases to increase the supply of current to said track brake device.

7. In a vehicle brake system, in combination, a brake cylinder, a magnetic track brake device, means for effecting a supply of fluid under pressure to said brake cylinder, fluid pressure operated means operated upon an increase in pressure for raising said track brake device from a track rail and operated upon a decrease in pressure for effecting engagement of said track brake device with the track rail, a magnet valve device operable when deenergized to supply fluid under pressure to said fluid pressure operated means and operable when energized to effect a decrease of pressure in said fluid pressure operated means, means operated at brake cylinder pressure for energizing said magnet valve device, and independently operated current controlling means operated at a low brake cylinder pressure for connecting said track brake device to a source of current supply and operable as said brake cylinder pressure increases to increase the supply current to said track brake device.

8. In a vehicle brake system, in combination, a brake cylinder, a magnetic track brake device, means for effecting a supply of fluid under pressure to said brake cylinder, a first circuit for supplying current to said track brake device, a resistance in said circuit, a second circuit operable when closed to effect lowering of said track brake device to engagement with a track rail, means operated by brake cylinder pressure for closing said second circuit, and separate means also operated by brake cylinder pressure for closing said first circuit and for cutting out portions of said resistance.

9. In a vehicle brake system, in combination, a brake cylinder, a magnetic track brake device, a straight air pipe to which fluid under pressure is supplied in effecting a supply of fluid under pressure to said brake cylinder, a brake valve device operable to effect a supply of fluid under pressure to said straight air pipe to variable degrees, an automatic valve device operated upon a decrease in pressure to isolate said brake valve device and to supply fluid under pressure to said straight air pipe to a maximum degree, electroresponsive means operated in response to straight air pipe pressure for effecting engagement of said track brake device with the track rail, and means operated by straight air pipe pressure for effecting and controlling the degree of energization of said track brake device.

10. In a vehicle brake system, in combination, a brake cylinder, a magnetic track brake device, electroresponsive means operable when energized to effect lowering of said track brake device to engagement with a track rail and when deenergized to effect raising of said track brake device above the track rail, current controlling means for effecting and controlling the degree of energization of said track brake device, means for effecting a supply of fluid under pressure to said brake cylinder, and means separate from said current controlling means and operable by brake cylinder pressure for effecting energization of said electroresponsive means and operation of said current controlling means, and operable at a predetermined low brake cylinder pressure to effect deenergization of said electroresponsive means and said track brake device.

CARLTON D. STEWART.

CERTIFICATE OF CORRECTION.

Patent No. 2,096,474.  October 19, 1937.

CARLTON D. STEWART.

It is hereby certified that error appears in the printed specification of the above numbered patent requiring correction as follows: Page 3, second column, line 15, claim 1, for "supply" read apply; and that the said Letters Patent should be read with this correction therein that the same may conform to the record of the case in the Patent Office.

Signed and sealed this 18th day of January, A. D. 1938.

Henry Van Arsdale,
Acting Commissioner of Patents.

(Seal)